Dec. 22, 1931.  L. F. BAASH ET AL  1,837,644
TONGS
Filed March 18 1930
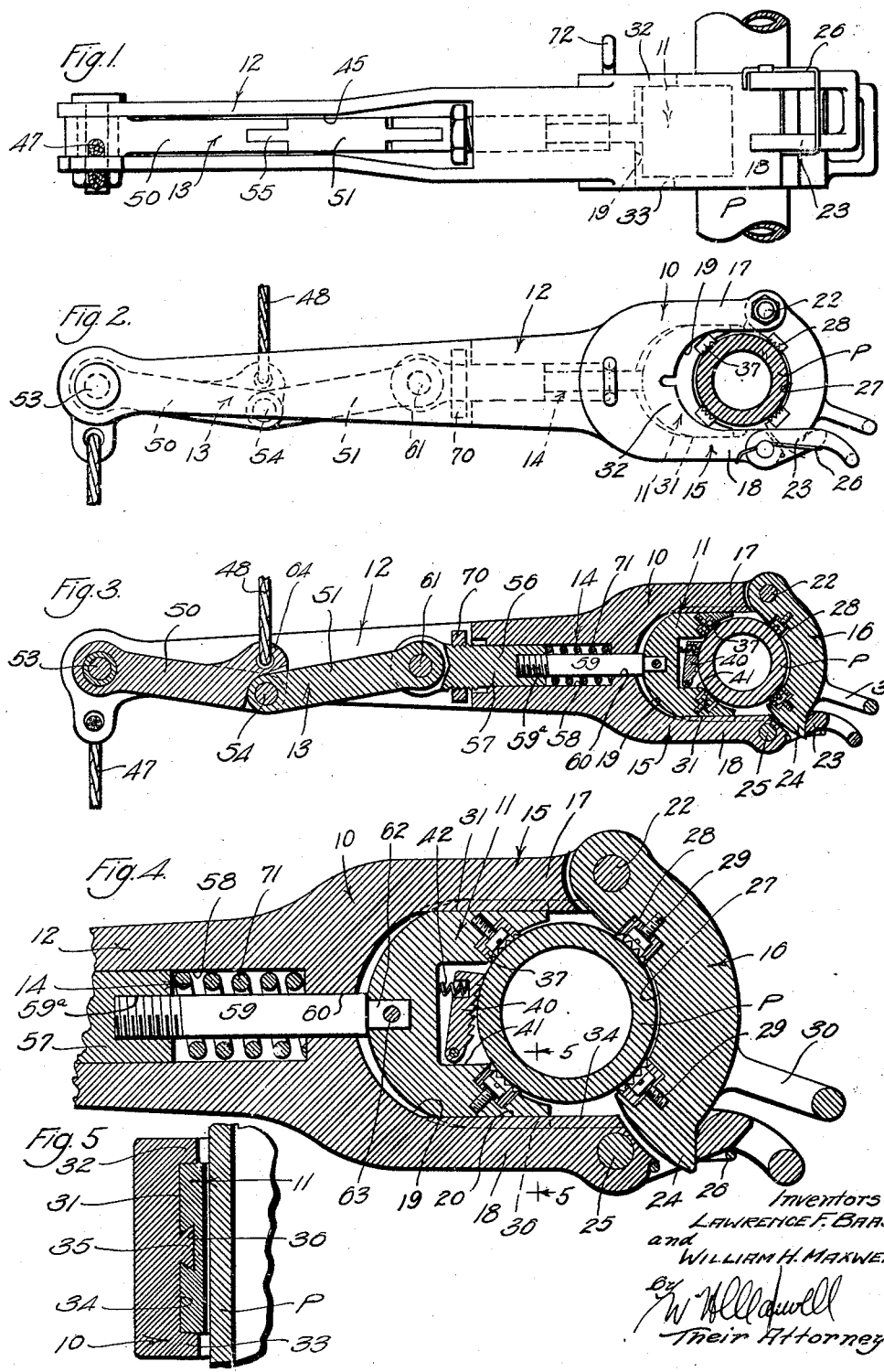
Inventors
LAWRENCE F. BAASH
and
WILLIAM H. MAXWELL
By
Their Attorney Patented Dec. 22, 1931

1,837,644

UNITED STATES PATENT OFFICE

LAWRENCE F. BAASH, OF LOS ANGELES, AND WILLIAM H. MAXWELL, OF BEVERLY HILLS, CALIFORNIA

TONGS

Application filed March 18, 1930. Serial No. 436,693.

This invention relates to tools and relates more particularly to wrenches or tongs useful for handling pipe, casing, and like objects. Various types and forms of tongs have been suggested and employed for handling pipe, tubing, casing, etc. The tongs most generally employed for handling casing, and the like, embody an operating handle or lever and means at one end of the lever for gripping the casing. The gripping means or parts of the usual tongs extend around the casing and are connected with the handle at spaced points to be operable into gripping or holding engagement with the casing through leverage gained at the connection with the handle. This type of tongs has certain characteristics limiting its effectiveness and practicability. For example, the leverage that can be obtained for operating the gripping parts is limited by the size and strength of the parts at the connection between the gripping parts and the end of the handle. When these parts are made sufficiently strong to withstand heavy strains, they are so large that they can not be related to the lever in a manner to gain the desired leverage. The usual tongs therefore are a compromise between size and strength on the one hand and leverage or mechanical action on the other hand.

A general object of the present invention is to provide improved tongs for handling pipe, casing, etc., operable to grip an object effectively and with great force.

Another object of the invention is to provide a tool of the character mentioned that is of simple, sturdy and well balanced construction and which embodies but few parts.

It is another object of the invention to provide tongs which are well balanced and which are particularly easy to handle and operate. The mechanism for operating the gripping element of the tongs is carried so that it operates to counterbalance the head or pipe encircling portion of the tool.

Another object of the invention is to provide tongs that embody a gripping element or jaw operated into gripping engagement with an object by the same force or pull that is employed for operating the tool to rotate or turn the object handled by the tool.

A further object of the invention is to provide a tool of the character mentioned in which the gripping element is automatically returned to a normal unactuated position upon the actuating force being released.

A further object of the invention is to provide tongs embodying a gripping element at the head of the tool and a toggle mechanism carried by the handle of the tool for operating the gripping element.

Another object of the invention is to provide a tool of the character just mentioned in which the toggle mechanism is adapted to be directly actuated by a line connected with the tool to turn it.

Another object of the invention is to provide a tool of the character mentioned that is particularly sturdy in construction and which is capable of withstanding hard usage.

Another object of the invention is to provide a tool of the character mentioned having a gripping element or jaw and a mechanism for operating the jaw mounted so that they are protected and are not readily damaged.

Another object of the invention is to provide tongs of the character mentioned embodying improved means for operating a gripping element or jaw.

Other objects and features of our invention will be best and more fully understood from the following detailed description of a typical form and application of the invention, throughout which description reference will be had to the accompanying drawings, in which:

Fig. 1 is a side elevation of the tool provided by the present invention being a view illustrating the tool arranged around a casing. Fig. 2 is a top or plan view of the tongs. Fig. 3 is a longitudinal detailed sectional view of the tool. Fig. 4 is an enlarged longitudinal detailed sectional view of the head portion of the tool, and Fig. 5 is a detailed transverse sectional view taken as indicated by line 5—5 on Fig. 4.

In accordance with the broader aspects of the invention the construction provided by our invention is applicable to or capable of embodiment in wrenches or tongs of various types intended for various purposes. Throughout the following disclosure we will describe the invention as embodied in tongs particularly suited for handling comparatively large objects such as large pipe or casing, say for instance well casing. It is to be understood, however, that the invention is not to be construed as limited to the particular form of the invention about to be described, but is to be taken as including any features that may fall within the scope of the claims.

The embodiment of our invention illustrated in the drawings includes, generally, a head 10, a gripping element 11 included in or carried by the head 10, a lever or handle 12, means 13 for operating the gripping element 11, and means 14 for automatically returning the gripping element 11 to its normal position after actuation.

The head 10 is in the nature of a work or casing-encircling means and is the active or working portion of the tool. The head may be designed and proportioned to accommodate objects of various sizes and shapes. Throughout the drawings we have illustrated a single simple form of head 10 which embraces or encircles a casing P. The particular head 10 illustrated in the drawings, includes generally an inner or main part 15 and an outer part or gate 16.

The main or inner part 15 of the head, in the preferred form of the invention, carries the gripping element 11. The inner part 15 of the head is substantially U-shaped, having two spaced side parts 17 and 18 between which there is an opening or recess 19. The opening 19 is provided to carry the gripping element 11, and its side walls 20, which are the inner sides of the parts 17 and 18, are made parallel and such as to slidably carry the element 11. The inner end of the opening 19 may be rounded or curved as shown throughout the drawings.

The outer part or gate 16 of the head 10 is in the nature of a closure means for the opening 19. The gate 16 is provided to hold or retain the casing P in the tool in position to be engaged by the gripping element 11. The gate 16 illustrated is in the form of a single rigid member pivoted to the inner part 15 of the head 10. In the drawings we have shown one end of the gate 16 pivotally attached to the outer end of the side part 17 of the head 10. The gate 16 may be pivotally connected with the side part 17 by a suitable bolt or pivot pin 22. In accordance with the preferred form of the invention means is provided for releasably holding or latching the gate 16 in the closed position around the casing P. A latch 23 may be pivotally carried at the outer end of side part 18 of the head 10 to cooperate with a lug 24 on the outer or free end of the gate 16. The latch 23 may be pivotally connected with the side part 18 by a pivot pin 25. The latch 23 may be normally yieldingly held by a spring 26 so that it is in position where it cooperates with the lug 24. The latch 23 and the lug 24 may be proportioned and related so that the latch automatically catches the lug 24 to hold the gate in the closed position when it is swung into a closed position around the casing P.

The inner side 27 of the gate 16 is shaped to effectively engage around the casing P or object handled by the tool. In the particular case illustrated the inner side 27 of the gate is curved to correspond to the external configuration of the casing P. Gripping parts in the form of replaceable dies 28 may be provided on the inner side 27 of the gate. The dies 28 may be removably secured in recesses in the inner side 27 by suitable screws 29. A suitable handle 30 may be provided on the outer side of the gate 16.

The gripping element 11 is in the nature of a jaw carried by the head 10. In the form of the invention disclosed the element 11 is carried by the inner part 15 of the head. The gripping element or jaw 11 is slidably carried in the opening 19 of the inner part 15 and is operable by the means 13 into gripping engagement with the pipe P. The jaw 11 is shaped to effectively operate in the opening 19 and to effectively engage or grip the pipe P. The element 11 may be a simple unitary part. The jaw or gripping element 11 is provided with parallel sides 31 which slidably engage the opposite side walls 20 of the opening 19 and has a rounded outer end to effectively fit the end of the opening 19. In the form of the invention illustrated the inner part 15 of the head 10 has what we will term upper and lower portions 32 and 33 respectively, over hanging or extending over the inner portion of the opening 19. These portions aid in guiding and protecting the gripping element 11.

The sides 31 of the gripping element 11 may slidably operate in guideways 34 in the side walls 20 of the opening 19. Further, dovetailed keys or guides 35 may be provided in the guideways 34 to slidably fit in keyways or grooves 36 in the gripping element 11. The outer or active end of the gripping element 11 is made to conform to the configuration of the object being handled by the tool, in the particular case shown it is rounded or made concave to conform to the exterior of the casing P. Replaceable gripping dies 37 may be provided at the active end of the gripping element 11 to engage the pipe P.

In accordance with the preferred embodiment of the invention means is provided on the gripping element 11 for initially resisting relative rotation between the tool and the casing P to insure gripping engagement between the element 11 and the pipe P when the tool is initially operated. We have shown a pipe engaging member 40 pivotally mounted in a socket or recess 41 in the active end of the gripping element 11. The member 40 is pivotally supported at one of its ends and is provided at its outer side with gripping parts or teeth to engage the exterior of the casing P. The member 40 is positioned where its free or outer end normally projects beyond the active end of the element 11. A spring 42 may be provided to yieldingly urge the member 40 into gripping engagement with the casing P.

The handle 12 carries the means 13 for operating the gripping element 11 and is preferably provided on or rigidly attached to the part of the head 10 which carries the element 11. The handle 12 may be formed integral with the inner part 15 of the head as shown in the drawings. The handle 12 is preferably made comparatively long and projects outwardly or rearwardly from the inner part 15 of the head. The outer portion of the handle 12 is yoked for a considerable distance to provide a transverse opening or space 45 for carrying the means 13. A lug is provided at the outer end of the handle 12 and has an opening to carry a return line 47.

The means 13 for operating the element 11 into gripping engagement with the casing P is carried by the handle 12 and is adapted to be operated directly by an operating line 48 for operating or turning the entire tool. The actuating means 13 is preferably in the nature of lever or toggle means. In the case illustrated it includes two pivotally connected links; a link 50 pivoted to the handle 12, and a link 51 connected with the gripping element 11. The links 50 and 51 are pivotally connected together and are arranged substantially longitudinally in the space 45 of the yoked portion of the handle 12. The outer end of the outer link 50 is connected to the handle 12 by a pivot pin 53 extending transversely through the handle 12. The inner end of the link 50 is pivotally connected with the link 51 by a pivot pin 54. In the particular case illustrated the inner end of the link 50 is yoked and the outer end of the link 51 is provided with a tongue 55 which extends into the yoked portion of the link 50 where it is held by the pivot pin 54. The inner end of the link 51 is pivotally connected to a rod 56 which forms a stem on the element 11.

In the case illustrated the stem of the element 11 is formed of two sections, an outer section 57 of comparatively large diameter slidable in an opening 58 in the handle 12, and an inner section 59 of reduced diameter slidable in an opening 60 in the inner part 15 of the head. The inner section 59 may be screw threaded into a socket 59ª in the end of the section 57. The link 51 may be secured to the outer end of the section 57 by a suitable pivot pin 61. The end of the section 59 extends into the opening 19 where it is connected with element 11. For instance, it may be provided with a reduced pin portion 62 fitting an opening in the gripping element 11. The pin 62 may be secured in the opening by a removable locking pin 63. The length of the stem may be varied by means of the screw thread connection between the sections 57 and 59 to vary the angularity of the links 50 and 51 so that the leverage of the links may be adjusted. The pin 63 may be removed to permit the adjustment of the section 59.

The actuating line 48 may be operatively connected with either the link 50 or the link 51 in any suitable manner. In the particular case illustrated the line 48 is connected with the link 50 opposite or adjacent the point of pivotal connection of the links 50 and 51. The line 48 is shown extending through an opening in a lug 64 projecting from one side of the link 50. The links 50 and 51 and the stem or rod 56 are proportioned and related so that when the gripping element 11 is in the unactuated or normal position the links 50 and 51 are buckled or project outwardly in one direction from the center of the handle 12. When a pull is applied to the line 48 tending to draw the links 50 and 51 inwardly into alignment with the rod 56 or the center of the handle, the gripping element 11 is forced into gripping engagement with the pipe P.

In accordance with the present invention means is provided for limiting the inward movement of the links 50 and 51 and for preventing the links 50 and 51 from assuming a position where they are in true axial alignment with the rod 56. We have shown this means in the form of a stop 70 provided on the rod 56 to limit the inward movement of the rod relative to the handle. The stop 70 may be in the form of a collar screw threaded on the rod 56 adapted to engage the handle at the inner end of the opening 45 to limit the movement of the rod. The stop 70 is positioned where it prevents the links from being operated to a dead center position where they cannot be returned by the return means 14. The action of the tool can be varied or adjusted by adjusting or changing the position of the stop collar 70 on the rod 56.

The means 14 is provided to return the gripping element 11 and the parts of the actuating means 13 to their normal positions after actuation. The means 14 may be in the form of spring means acting through the rod 56. The means 14 may include a helical spring 71 arranged in the opening 58 and surrounding the section 59 of the rod 56. The spring 71 is arranged between the inner end of the section 57 of the rod and the inner end of the opening 58. The spring 71 is compressed upon actuation of the means 13 so that upon release of the means 13 it acts outwardly on the section 57 of the rod to return the gripping element 11 and the links 50 and 51 to their normal unactuated positions.

In the form of the invention illustrated means is provided for suspending the tool. An eye bolt 72 projects upwardly from the upper side of the tool. The bolt 72 is adapted to receive a line or support for carrying the tongs.

It is believed that the various features of our present invention will be readily apparent from the foregoing detailed description. The type of tongs described above are particularly adapted for use in a well derrick for handling well casing, drill pipe, etc. When the gate 16 is closed about the casing P the operating line 48 may be actuated to tend to shift the links 50 and 51 to the in position and to operate the gripping element 11 into tight gripping engagement with the pipe P. A continued strain or pull on the line 48 after actuation of the gripping element 11 will cause rotation or turning of the tool and the casing P. The line 47 may be employed to return the tool to its normal position after use. It is to be noted that the invention provides tongs in which a pipe, or the like, may be tightly gripped for rotation or for holding against rotation. It is to be noted that the tongs provided by our present invention do not embody chains or levers at the head or adjacent the head of the tongs. The means 13 for operating the gripping element 11 is located in the handle portion of the tool where it can be made large and strong and where it tends to balance the head 10 of the tongs.

It is also to be noted that the means 13, being a toggle means causes the gripping element to be forced into gripping engagement with the casing with great force. The shape of the gripping element is such that this force is distributed on the casing so that the casing is not crushed or dented.

The parts of the tool may be proportioned and related so that the gripping element has a substantial range of movement so that the tool is adapted to handle objects varying considerably in size.

Having described only a typical preferred form of our invention, we do not wish to limit ourselves to the specific details set forth, but wish to reserve to ourselves any changes or variations that may appear to those skilled in the art or fall within the scope of the following claims:

Having described our invention, we claim:

1. Tongs of the character described including, a lever, a head on the lever for encircling an object, a gripping element slidably carried by the head, and means on the lever a substantial distance from the head for operating the gripping element from a line for operating the tool including, two pivotally connected links to be operated by the line, one link being connected with the lever, the other being connected with the gripping element.

2. A tool of the character described including, pipe encircling means, a handle, a gripping element slidably carried by the said means, and means for operating the gripping element including a rod connected with the element and slidable in the handle, and two pivotally connected links in an opening in the handle, one link being pivotally mounted on the handle, the other link being connected to the rod.

3. Tongs of the character described including, an object encircling element, a handle, a gripping jaw carried by the element, a rod projecting from the jaw and slidable in an opening in the handle, the handle being yoked at the end of said opening, and means for operating the jaw including, two pivotally connected links carried in the yoked part of the handle, one link being pivotally supported by the handle, the other link being connected to the rod.

4. Tongs of the character described including, an object encircling element, a handle, a gripping jaw carried by the element, a rod projecting from the jaw and slidable in an opening in the handle, the handle being yoked at the end of said opening, means for operating the jaw including two pivotally connected links carried in the yoked portion of the handle and connected with the rod, and means in the said opening for returning the jaw after actuation.

5. Tongs of the character described including, an object encircling element, a handle, a gripping jaw carried by the element, a rod projecting from the jaw and slidable in an opening in the handle, the handle being yoked at the end of said opening, means for operating the jaw including two pivotally connected links carried in the yoked portion of the handle and connected with the rod, and a spring in the said opening for returning the jaw after actuation.

6. Tongs including a pipe encircling head, a handle projecting from the head, a gripping jaw carried by the head for gripping a pipe, and means for operating the jaw directly by the force for turning the tongs including a pair of pivotally connected links on the handle at a point a substantial distance from the head, one of the links being pivoted to the handle and the other being connected with the jaw.

7. Tongs including a pipe encircling head, a handle projecting from the head, a gripping jaw carried by the head for gripping a pipe, and means for operating the jaw directly by the force for turning the tongs including a pair of pivotally connected links on the handle at a point a substantial distance from the head, one of the links being pivoted to the handle and the other being connected with the jaw, and means on one of the links adjacent their point of pivotal connection for receiving a tong operating member.

8. Tongs including, an object encircling head, a handle projecting from the head, a gripping jaw slidable in the head, a rod projecting from the jaw and slidable in an opening in the handle, and means for operating the jaw including two pivotally connected links in an opening in the handle and projecting therefrom for connection with an operating means, one of the links being pivoted to the handle, the other being pivotally connected with the rod.

9. Tongs including, an object encircling head, a handle projecting from the head, a gripping jaw slidable in the head, a rod projecting from the jaw and slidable in an opening in the handle, adjustable stop means on the rod for limiting movement of the jaw, and means for operating the jaw including two pivotally connected links in an opening in the handle and projecting therefrom for connection with an operating means, one of the links being pivoted to the handle, the other being pivotally connected with the rod.

In witness that we claim the foregoing we have hereunto subscribed our names this 14th day of March, 1930.

LAWRENCE F. BAASH.
WILLIAM H. MAXWELL.